United States Patent
Zhang

(10) Patent No.: US 11,419,196 B2
(45) Date of Patent: Aug. 16, 2022

(54) WARNING LIGHT CONTROL SYSTEM BASED ON DANGEROUS BEHAVIOR DETECTION

(71) Applicant: YUYAO FEITE PLASTIC CO., LTD., Yuyao (CN)

(72) Inventor: Shanqin Zhang, Yuyao (CN)

(73) Assignee: YUYAO FEITE PLASTIC CO., LTD., Yuyao (CN)

( * ) Notice: Subject to any disclaimer, the term of this patent is extended or adjusted under 35 U.S.C. 154(b) by 1088 days.

(21) Appl. No.: 16/065,970

(22) PCT Filed: Jun. 30, 2017

(86) PCT No.: PCT/CN2017/091145
§ 371 (c)(1),
(2) Date: Jun. 25, 2018

(87) PCT Pub. No.: WO2018/223452
PCT Pub. Date: Dec. 13, 2018

(65) Prior Publication Data
US 2021/0197714 A1 Jul. 1, 2021

(30) Foreign Application Priority Data
Jun. 6, 2017 (CN) .......................... 201710419068.7

(51) Int. Cl.
*G05D 1/00* (2006.01)
*H05B 47/105* (2020.01)
(Continued)

(52) U.S. Cl.
CPC ......... *H05B 47/105* (2020.01); *B60Q 1/2611* (2013.01); *B60Q 1/52* (2013.01);
(Continued)

(58) Field of Classification Search
USPC .................. 340/904, 468, 471, 472, 474
See application file for complete search history.

(56) References Cited

U.S. PATENT DOCUMENTS

2010/0194556 A1\* 8/2010 LaRosa ................ B60Q 1/2615
340/471
2018/0050800 A1\* 2/2018 Boykin .............. H04B 7/18506
(Continued)

FOREIGN PATENT DOCUMENTS

CN            2613680 Y      4/2004
CN         2008152950 A      7/2008
(Continued)

OTHER PUBLICATIONS

International Search Report issued in International Application No. PCT/CN2017/091145, dated Mar. 7, 2018.

*Primary Examiner* — Brent Swarthout
(74) *Attorney, Agent, or Firm* — Charles C. Achkar; Ostrolenk Faber LLP.

(57) ABSTRACT

A warning light control system based on dangerous behavior detection includes a plurality of red light-emitting diodes, a plurality of blue light-emitting diodes, a control element, a circuit board, and a lampshade. The plurality of red light-emitting diodes and the plurality of blue light-emitting diodes are disposed at one end of the circuit board. The control element is disposed at another end of the circuit board. The lampshade is disposed above the plurality of red light-emitting diodes, the plurality of blue light-emitting diodes, the control element, and the circuit board. The lampshade comprises a lens for concentrating and emitting light uniformly. The lampshade is fixed on a top of a police car. Wherein, the number of the plurality of red light-emitting diodes is equal to the number of the plurality of blue light-emitting diodes. The system acts a deterrent effect on the dangerous behavior.

5 Claims, 1 Drawing Sheet

(51) Int. Cl.
*H05B 47/12* (2020.01)
*H05B 47/125* (2020.01)
*B60Q 1/26* (2006.01)
*B60Q 1/52* (2006.01)
*F21S 10/02* (2006.01)
*G06T 7/00* (2017.01)
*F21Y 113/13* (2016.01)
*F21W 107/10* (2018.01)

(52) U.S. Cl.
CPC .......... *F21S 10/023* (2013.01); *G06T 7/0002* (2013.01); *H05B 47/12* (2020.01); *H05B 47/125* (2020.01); *F21W 2107/10* (2018.01); *F21Y 2113/13* (2016.08); *G06T 2207/20032* (2013.01); *G06T 2207/30252* (2013.01)

(56) References Cited

U.S. PATENT DOCUMENTS

2020/0326704 A1* 10/2020 Blanco ................ G05D 1/0088
2021/0380137 A1* 12/2021 Domeyer .......... B60W 60/0017

FOREIGN PATENT DOCUMENTS

| | | |
|---|---|---|
| CN | 102306278 A | 1/2012 |
| CN | 103220852 A | 7/2013 |
| CN | 105844829 A | 8/2016 |
| CN | 106448003 A | 2/2017 |
| KR | 20060018787 A | 3/2006 |

* cited by examiner

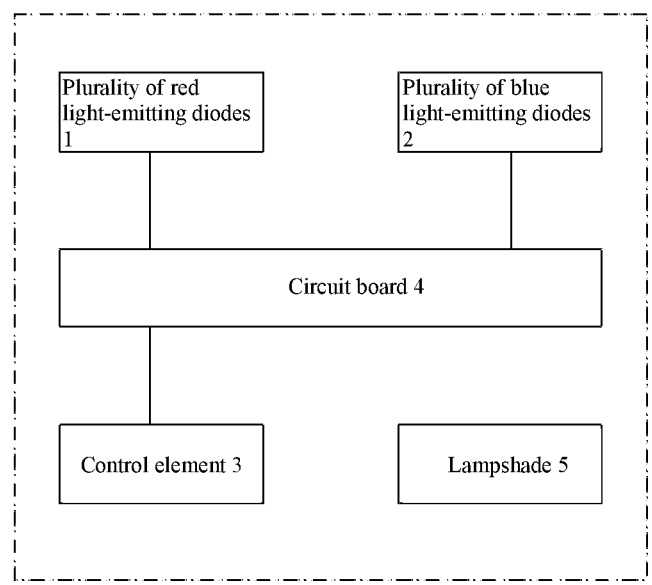

WARNING LIGHT CONTROL SYSTEM BASED ON DANGEROUS BEHAVIOR DETECTION

CROSS REFERENCE TO RELATED APPLICATIONS

The present application is a § 371 National Phase application based on PCT/CN2017/091145 filed Jun. 30, 2017, which claims the benefit of China application No. 201710419068.7 filed Jun. 6, 2017, the subject matter of each of which is incorporated by reference in their entirety.

FIELD OF THE INVENTION

The present invention relates to a warning light, and more particularly to a warning light control system based on dangerous behavior detection.

BACKGROUND OF THE INVENTION

Warning lights, as implied by the name, play a warning reminder role. They are generally used to maintain road safety and effectively reduce traffic accidents. They can also prevent potential unsafe hidden dangers. Under normal circumstances, warning lights are usually used for police cars, construction vehicles, fire engines, ambulances, precaution management vehicles, road maintenance vehicles, tractors, emergency A/S vehicles, machinery equipment, and the like.

Under normal circumstances, warning lights may have a variety of lengths depending on the vehicle type and use and are provided with a lampshade. When required, the lampshade may be combined with composite colors. Warning lights are classified as light bulb rotating lights, LED flash lights, and xenon strobe tube lights according to different light sources. Compared with light bulb rotating lights, LED flash lights have the advantages of long service life, energy saving and lower heat.

However, the switch control of the conventional warning light is still operated manually. The switch control of the warning light of the police car cannot be automatically performed based on the detection of dangerous behaviors when the policemen are on petrol, so the burden on policemen cannot be reduced. Accordingly, the inventor of the present invention has devoted himself based on his many years of practical experiences to solve these problems.

SUMMARY OF THE INVENTION

In order to solve the above problem, the present invention provides a warning light control system based on dangerous behavior detection for receiving a street view image, performing various image processing on the street view image and matching various reference dangerous behavior outlines one by one. If the match is successful, a signal of the presence of dangerous behavior is output to automatically start a plurality of red light-emitting diodes and a plurality of blue light-emitting diodes to emit light.

According to one aspect of the present invention, a warning light control system based on dangerous behavior detection is provided. The system comprises a plurality of red light-emitting diodes, a plurality of blue light-emitting diodes, a control element, a circuit board, and a lampshade. The plurality of red light-emitting diodes and the plurality of blue light-emitting diodes are disposed at one end of the circuit board. The control element is disposed at another end of the circuit board. The lampshade is disposed above the plurality of red light-emitting diodes, the plurality of blue light-emitting diodes, the control element, and the circuit board. The lampshade comprises a lens for concentrating and emitting light uniformly. The lampshade is fixed on a top of a police car. Wherein, the number of the plurality of red light-emitting diodes is equal to the number of the plurality of blue light-emitting diodes.

Preferably, the warning light control system based on dangerous behavior detection further comprises an MMC storage device for storing various reference dangerous behavior outlines, a preset mean square error threshold and a preset signal-to-noise ratio threshold.

Preferably, the warning light control system based on dangerous behavior detection further comprises a gun-type camera device and a signal analysis device. The gun-type camera device is used for shooting a street view where the police car is located so as to obtain and output a corresponding street view image. The signal analysis device is connected to the gun-type camera device and used for receiving the street view image. Based on pixel values of respective pixels of the street view image, a mean square error of the pixel values of the street view image is determined to be output as a target mean square error.

Preferably, the warning light control system based on dangerous behavior detection further comprises a noise analysis device for receiving the street view image and performing a noise analysis on the street view image to obtain a primary noise signal with maximum noise amplitude and a secondary noise signal with secondary noise amplitude. Based on the primary noise signal, the secondary noise signal and the street view image, a signal-to-noise ratio of the street View image is determined to be output as a target signal-to-noise ratio.

Preferably, the warning light control system based on dangerous behavior detection further comprises a filter switching device, a Kalman filter device, an adaptive wavelet filter device, an adaptive median filter device, and a target recognition device.

The filter switching device is connected to the signal analysis device and the noise analysis device respectively for receiving the target mean square error and the target signal-to-noise ratio. Wherein, when the target signal-to-noise ratio is less than or equal to the preset signal-to-noise ratio and the target mean square error is greater than or equal to the preset mean square error threshold, a first switching signal is sent. When the target signal-to-noise ratio is less than or equal to the preset signal-to-noise ratio and the target mean square error is greater than the preset mean square error, a first switching signal is sent. When the target signal-to-noise ratio is greater than the preset signal-to-noise ratio threshold and the target mean square error is greater than or equal to the preset mean square error threshold, a third switching signal is sent. When the target signal-to-noise ratio is greater than the preset signal-to-noise ratio threshold and the target mean square error is less than the preset mean square error threshold, a fourth switching signal is sent.

The Kalman filter device is connected to the filter switching device for performing Kalman filter device processing on the street view image to obtain a target filtered image when receiving the fourth switching signal;

The adaptive wavelet filter device is connected to the filter switching device for performing adaptive wavelet filter processing on the street view image to obtain a wavelet filtered image when receiving the first switching signal and sending the wavelet filtered image to the adaptive median filter device; and for performing adaptive wavelet filter processing on the street view image to directly obtain the target filtered image when receiving the third switching signal.

The adaptive median filter device is connected to the filter switching device for receiving the wavelet filtered image from the adaptive wavelet filter device when receiving the first switching signal and performing adaptive median filter processing on the wavelet filtered image so as to obtain the target filtered image; and for performing adaptive median filter processing on the street view image to directly obtain the target filtered image when receiving the second switching signal.

The target recognition device is connected to the Kalman filter device, the adaptive wavelet filter device and the adaptive median filter device respectively for receiving the target filtered image and matching the target filtered image with the various reference dangerous behavior outlines one by one. Wherein, if a match is successful, a signal of the presence of dangerous behavior is output. If all matches fail, a signal of no dangerous behavior is output.

Wherein, the control element automatically activates the plurality of red light-emitting diodes and the plurality of blue light-emitting diodes to emit light when receiving the signal of the presence of danger behavior.

Wherein, the adaptive median filter processing performed by the adaptive median filter device comprises for each pixel of the received image, obtaining various pixel blocks corresponding to the pixel centered on the pixel by using various filtering windows, determining a variance of a gray value in each of the pixel blocks, selecting a corresponding one of the filtering windows with a smallest variance of the gray value as a target filtering window to perform median filtering on the pixel value of the pixel to obtain a filter pixel value thereof, and obtaining the filtered image output by the adaptive median filter device based on the filter pixel values of all the pixels of the received image.

Wherein, the adaptive wavelet filter processing performed by the adaptive wavelet filter device comprises performing wavelet decomposition on the received image to obtain four sub-bands of LL, LH, HL and HH, determining an average of the HH sub-bands, calculating an optimal threshold of wavelet shrinkage based on the average, and performing wavelet reconstruction of the image based on the optimal threshold of wavelet shrinkage to obtain the filtered image output by the adaptive wavelet filter device;

Wherein, the Kalman filter device enters a working mode from a power saving mode when receiving the fourth switching signal. The adaptive wavelet filter device enters the working mode from the power saving mode when receiving the first switching signal or the third switching signal. The adaptive median filter device enters the working mode from the power saving mode when receiving the first switching signal or the second switching signal.

Preferably, the adaptive wavelet filter device enters the power saving mode from the working mode when receiving the second switching signal or the fourth switching signal.

Preferably, the adaptive median filter device enters the power saving mode from the working mode when receiving the third switching signal or the fourth switching signal.

Preferably, the Kalman filter device enters the power saving mode from the working mode when receiving the first switching signal, the second switching signal or the third switching signal.

Preferably, the warning light control system based on dangerous behavior detection further comprises a user input device for manually turning on the plurality of red light-emitting diodes and the plurality of blue light-emitting diodes to emit light, or for manually turning off the plurality of red light-emitting diodes and the plurality of blue light-emitting diodes.

BRIEF DESCRIPTION OF THE DRAWINGS

The embodiments of the present invention will be described below with reference to the accompanying drawings, in which:

FIG. 1 is a structural block diagram of a warning light control system based on dangerous behavior detection according to an embodiment of the present invention.

DETAILED DESCRIPTION OF THE PREFERRED EMBODIMENTS

Embodiments of the present invention will now be described, by way of example only, with reference to the accompanying drawings.

An embodiment of a warning light control system based on dangerous behavior detection of the present invention will be described in detail below with reference to the accompanying drawings.

Warning lights are widely used in various special places for warning signs, and may be suitable for municipal and construction operations and guardianship, first-aid, rescue workers as signal contact and direction instructions. In general, warning lights are mainly applied to police cars for warning the passing vehicles and pedestrians to dodge and for providing a deterrent effect for the arrested criminals as well as a sense of security for the masses so as to avoid imminent wrongful acts.

The switch control of the conventional warning light is operated manually through a button, which is dependent on the manual operation of the police officers and cannot be switched automatically based on the specific circumstances of street views. In order to overcome the foregoing deficiencies, the present invention is to provide a warning light control system based on dangerous behavior detection.

FIG. 1 is a structural block diagram of a warning light control system based on dangerous behavior detection according to an embodiment of the present invention. The system includes a plurality of red light-emitting diodes 1, a plurality of blue light-emitting diodes 2, a control element 3, a circuit board 4, and a lampshade 5. The plurality of red light-emitting diodes 1 and the plurality of blue light-emitting diodes 2 are disposed at one end of the circuit board 4. The control element 3 is disposed at another end of the circuit board 4. The lampshade 5 is disposed above the plurality of red light-emitting diodes 1, the plurality of blue light-emitting diodes 2, the control element 3 and the circuit board 4. The lampshade 5 comprises a lens for concentrating and emitting light uniformly. The lampshade 5 is fixed on the top of a police car. The number of the plurality of red light-emitting diodes 1 is equal to the number of the plurality of blue light-emitting diodes 2.

Next, the specific structure of the warning light control system based on dangerous behavior detection of the present invention will be further described.

The warning light control system based on dangerous behavior detection may further comprise an MMC storage device for storing various reference dangerous behavior outlines, a preset mean square error threshold, and a preset signal-to-noise ratio threshold.

The warning light control system based on dangerous behavior detection may further comprise a gun-type camera device and a signal analysis device. The gun-type camera device is used for shooting a street view where the police car is located so as to obtain and output a corresponding street view image.

The signal analysis device is connected to the gun-type camera device and used for receiving the street view image. Based on the pixel values of the respective pixels of the street view image, the mean square error of the pixel values of the street view image is determined to be output as a target mean square error.

The warning light control system based on dangerous behavior detection may further comprise a noise analysis device for receiving the street view image and performing a noise analysis on the street view image to obtain a primary noise signal with the maximum noise amplitude and a secondary noise signal with the secondary noise amplitude. Based on the primary noise signal, the secondary noise signal and the street view image, the signal-to-noise ratio of the street View image is determined to be output as a target signal-to-noise ratio.

The warning light control system based on dangerous behavior detection may further comprise a filter switching device, a Kalman filter device, an adaptive wavelet filter device, an adaptive median filter device, and a target recognition device.

The filter switching device is connected to the signal analysis device and the noise analysis device respectively for receiving the target mean square error and the target signal-to-noise ratio. When the target signal-to-noise ratio is less than or equal to the preset signal-to-noise ratio and the target mean square error is greater than or equal to the preset mean square error threshold, a first switching signal is sent. When the target signal-to-noise ratio is less than or equal to the preset signal-to-noise ratio and the target mean square error is greater than the preset mean square error, a first switching signal is sent. When the target signal-to-noise ratio is greater than the preset signal-to-noise ratio threshold and the target mean square error is greater than or equal to the preset mean square error threshold, a third switching signal is sent. When the target signal-to-noise ratio is greater than the preset signal-to-noise ratio threshold and the target mean square error is less than the preset mean square error threshold, a fourth switching signal is sent.

The Kalman filter device is connected to the filter switching device for performing Kalman filter device processing on the street view image to obtain a target filtered image when receiving the fourth switching signal.

The adaptive wavelet filter device is connected to the filter switching device for performing adaptive wavelet filter processing on the street view image to obtain a wavelet filtered image when receiving the first switching signal and sending the wavelet filtered image to the adaptive median filter device; and further for performing adaptive wavelet filter processing on the street view image to directly obtain the target filtered image when receiving the third switching signal.

The adaptive median filter device is connected to the filter switching device for receiving the wavelet filtered image from the adaptive wavelet filter device when receiving the first switching signal and performing adaptive median filter processing on the wavelet filtered image so as to obtain the target filtered image; and for performing adaptive median filter processing on the street view image to directly obtain the target filtered image when receiving the second switching signal.

The target recognition device is connected to the Kalman filter device, the adaptive wavelet filter device and the adaptive median filter device, respectively for receiving the target filtered image and matching the target filtered image with the various reference dangerous behavior outlines one by one. If the match is successful, a signal of the presence of dangerous behavior is output. If all matches fail, a signal of no dangerous behavior is output.

Wherein, the control element 3 automatically activates the plurality of red light-emitting diodes 1 and the plurality of blue light-emitting diodes 2 to emit light when receiving the signal of the presence of danger behavior.

Wherein, the adaptive median filter processing performed by the adaptive median filter device comprises for each pixel of the received image, obtaining various pixel blocks corresponding to the pixel centered on the pixel by using various filtering windows, determining the variance of the gray value in each of the pixel blocks, selecting a corresponding one of the filtering window with the smallest variance of the gray value as a target filtering window to perform median filtering on the pixel value of the pixel to obtain a filter pixel value thereof, and obtaining the filtered image output by the adaptive median filter device based on the filter pixel values of all the pixels of the received image.

Wherein, the adaptive wavelet filter processing performed by the adaptive wavelet filter device comprises performing wavelet decomposition on the received image to obtain four sub-bands of LL, LH, HL and HH, determining an average of the HH sub-bands, calculating the optimal threshold of wavelet shrinkage based on the average, and performing wavelet reconstruction of the image based on the optimal threshold of wavelet shrinkage to obtain the filtered image output by the adaptive wavelet filter device.

Wherein, the Kalman filter device enters a working mode from a power saving mode when receiving the fourth switching signal. The adaptive wavelet filter device enters the working mode from the power saving mode when receiving the first switching signal or the third switching signal. The adaptive median filter device enters the working mode from the power saving mode when receiving the first switching signal or the second switching signal.

In addition, in the warning light control system based on dangerous behavior detection, the adaptive wavelet filter device enters the power saving mode from the working mode when receiving the second switching signal or the fourth switching signal.

In addition, in the warning light control system based on dangerous behavior detection, the adaptive median filter device enters the power saving mode from the working mode when receiving the third switching signal or the fourth switching signal.

In addition, in the warning light control system based on dangerous behavior detection, the Kalman filter device enters the power saving mode from the working mode when receiving the first switching signal, the second switching signal or the third switching signal.

In addition, the warning light control system based on dangerous behavior detection is provided with a user input device for manually turning on the plurality of red light-emitting diodes 1 and the plurality of blue light-emitting diodes 2 to emit light, or for manually turning off the plurality of red light-emitting diodes 1 and the plurality of blue light-emitting diodes 2.

Wherein, the median filtering has a good filtration effect for the pulse noise. Especially, when the noise is filtered, the edge of the signal can be protected simultaneously so that it is not blurred. The linear filtering method doesn't have these good features. In addition, the median filtering algorithm is relatively simple and easy to implement in hardware. Therefore, once the median filtering method is proposed, it will get important applications in digital signal processing.

The median filtering is a non-linear signal processing technique based on the order statistical theory, which can effectively suppress noise. The main idea of the median filtering is to run through the signal entry by entry, replacing each entry with the median of neighboring entries, and enable the surrounding pixel values close to the true value to eliminate isolated noise points.

The method uses a two-dimensional sliding template of a certain structure to sort the pixels in the template according to the pixel values to generate a two-dimensional data sequence of monotonic increase (or decrease). The output of the two-dimensional median filtering is $g(x,y)=med\{f(x-k, y-l),(k,l \in W)\}$, wherein $f(x,y)$ and $g(x,y)$ are the original image and the processed image, respectively. W is the two-dimensional template, usually 3*3, 5*5 area, which may be in different shapes, such as linear, circular, cross, annular shape and so on.

The warning light control system based on dangerous behavior detection of the present invention aims at the technical problem that the switch control of the warning light cannot be automated in the prior art. By capturing and accurately processing the street view image, the dangerous behaviors in the street view are identified. Based on the identified dangerous behavior, the various light sources of the warning light can be automatically turned on, thus solving the above technical problems.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A warning light control system based on dangerous behavior detection, comprising: a plurality of red light-emitting diodes, a plurality of blue light-emitting diodes, a control element, a circuit board and a lampshade, the plurality of red light-emitting diodes and the plurality of blue light-emitting diodes being disposed at one end of the circuit board, the control element being disposed at another end of the circuit board, the lampshade being disposed above the plurality of red light-emitting diodes, the plurality of blue light-emitting diodes, the control element and the circuit board, the lampshade comprising a lens for concentrating and emitting light uniformly, the lampshade being fixed on a top of a police car; wherein the number of the plurality of red light-emitting diodes is equal to the number of the plurality of blue light-emitting diodes;

further comprising an MMC storage device for storing various reference dangerous behavior outlines, a preset mean square error threshold and a preset signal-to-noise ratio threshold;

further comprising a gun-type camera device and a signal analysis device; the gun-type camera device being used for shooting a street view where the police car is located so as to obtain and output a corresponding street view image; the signal analysis device being connected to the gun-type camera device and used for receiving the street view image, based on pixel values of respective pixels of the street view image, a mean square error of the pixel values of the street view image being determined to be output as a target mean square error;

further comprising a noise analysis device for receiving the street view image and performing a noise analysis on the street view image to obtain a primary noise signal with maximum noise amplitude and a secondary noise signal with secondary noise amplitude, based on the primary noise signal, the secondary noise signal and the street view image, a signal-to-noise ratio of the street View image being determined to be output as a target signal-to-noise ratio;

further comprising a filter switching device, a Kalman filter device, an adaptive wavelet filter device, an adaptive median filter device and a target recognition device;

the filter switching device being connected to the signal analysis device and the noise analysis device respectively for receiving the target mean square error and the target signal-to-noise ratio, wherein when the target signal-to-noise ratio is less than or equal to the preset signal-to-noise ratio and the target mean square error is greater than or equal to the preset mean square error threshold, a first switching signal is sent; when the target signal-to-noise ratio is less than or equal to the preset signal-to-noise ratio and the target mean square error is less than the preset mean square error, a second switching signal is sent; when the target signal-to-noise ratio is greater than the preset signal-to-noise ratio threshold and the target mean square error is greater than or equal to the preset mean square error threshold, a third switching signal is sent; when the target signal-to-noise ratio is greater than the preset signal-to-noise ratio threshold and the target mean square error is less than the preset mean square error threshold, a fourth switching signal is sent;

the Kalman filter device being connected to the filter switching device for performing Kalman filter device processing on the street view image to obtain a target filtered image when receiving the fourth switching signal;

the adaptive wavelet filter device being connected to the filter switching device for performing adaptive wavelet filter processing on the street view image to obtain a wavelet filtered image when receiving the first switching signal and sending the wavelet filtered image to the adaptive median filter device; and for performing adaptive wavelet filter processing on the street view image to directly obtain the target filtered image when receiving the third switching signal;

the adaptive median filter device being connected to the filter switching device for receiving the wavelet filtered image from the adaptive wavelet filter device when receiving the first switching signal and performing adaptive median filter processing on the wavelet filtered image so as to obtain the target filtered image; and for performing adaptive median filter processing on the street view image to directly obtain the target filtered image when receiving the second switching signal;

the target recognition device being connected to the Kalman filter device, the adaptive wavelet filter device and the adaptive median filter device respectively for receiving the target filtered image and matching the target filtered image with the various reference dangerous behavior outlines one by one, wherein if a match is successful, a signal of the presence of dangerous behavior is output; if all matches fail, a signal of no dangerous behavior is output;

wherein the control element automatically activates the plurality of red light-emitting diodes and the plurality of blue light-emitting diodes to emit light when receiving the signal of the presence of danger behavior;

wherein the adaptive median filter processing performed by the adaptive median filter device comprises for each pixel of the received image, obtaining various pixel blocks corresponding to the pixel centered on the pixel by using various filtering windows, determining a variance of a gray value in each of the pixel blocks, selecting a corresponding one of the filtering windows with a smallest variance of the gray value as a target filtering window to perform median filtering on the pixel value of the pixel to obtain a filter pixel value thereof, and obtaining the filtered image output by the adaptive median filter device based on the filter pixel values of all the pixels of the received image;

wherein the adaptive wavelet filter processing performed by the adaptive wavelet filter device comprises performing wavelet decomposition on the received image to obtain four sub-bands of LL, LH, HL and HH, determining an average of the HH sub-bands, calculating an optimal threshold of wavelet shrinkage based on the average, and performing wavelet reconstruction of the image based on the optimal threshold of wavelet shrinkage to obtain the filtered image output by the adaptive wavelet filter device;

wherein the Kalman filter device enters a working mode from a power saving mode when receiving the fourth switching signal; the adaptive wavelet filter device enters the working mode from the power saving mode when receiving the first switching signal or the third switching signal; the adaptive median filter device enters the working mode from the power saving mode when receiving the first switching signal or the second switching signal.

2. The warning light control system based on dangerous behavior detection as claimed in claim 1, wherein the adaptive wavelet filter device enters the power saving mode from the working mode when receiving the second switching signal or the fourth switching signal.

3. The warning light control system based on dangerous behavior detection as claimed in claim 2, wherein the adaptive median filter device enters the power saving mode from the working mode when receiving the third switching signal or the fourth switching signal.

4. The warning light control system based on dangerous behavior detection as claimed in claim 3, wherein the Kalman filter device enters the power saving mode from the working mode when receiving the first switching signal, the second switching signal or the third switching signal.

5. The warning light control system based on dangerous behavior detection as claimed in claim 4, further comprising a user input device for manually turning on the plurality of red light-emitting diodes and the plurality of blue light-emitting diodes to emit light, or for manually turning off the plurality of red light-emitting diodes and the plurality of blue light-emitting diodes.

\* \* \* \* \*